ROTARY SOLENOID

Original Filed Nov. 14, 1966 2 Sheets-Sheet 1

INVENTOR.
RAYMOND J. GANOWSKY
BY Thomson & Thomson
ATTORNEYS

ROTARY SOLENOID

Original Filed Nov. 14, 1966 2 Sheets-Sheet 2

INVENTOR.
RAYMOND J. GANOWSKY
BY Thomson & Thorne
ATTORNEYS

United States Patent Office

Re. 27,247
Reissued Dec. 21, 1971

27,247
ROTARY SOLENOID

Raymond J. Ganowsky, Clifton Springs, N.Y., assignor to Cliftronics, Inc., Clifton Springs, N.Y.

Original No. 3,419,831, dated Dec. 31, 1968, Ser. No. 593,838, Nov. 14, 1966. Application for reissue Feb. 13, 1970, Ser. No. 11,048
Int. Cl. H01f *7/08*
U.S. Cl. 335—228 21 Claims

Matter enclosed in heavy brackets [ ] appears in the original patent but forms no part of this reissue specification; matter printed in italics indicates the additions made by reissue.

ABSTRACT OF THE DISCLOSURE

A rotary solenoid having only a single antifriction ball converter between the armature, preferably a hinged "clapper" type, and the top surface of the rotatable output shaft. There are a pair of coactive oppositely inclined cam surfaces, one each in the armature and top surface of the output shaft between which is retained the single ball converter for transmitting arcuate pivotal movement of the armature into rotary movement of the output shaft.

This invention relates to rotary solenoid devices and more specifically an improvement in such devices specifically adapted for use with my prior invention disclosed in U.S. Patent No. 3,144,593.

It will be understood to one skilled in the art that certain aspects of my invention are suitable for adaptation with rotary solenoid devices generally, even though they are particularly suitable as an improvement of my prior invention of the hinged "clapper" type rotary solenoid described in U.S. Pat. No. 3,144,593.

It is one object of my invention to provide an improvement in rotary solenoid converters and more specifically an improvement in such converters for my hinged "clapper" type.

It is a significant object of my invention to provide an improved rotary solenoid in which only a single antifriction ball is coactively retained between the pair of oppositely inclined ball race cam surfaces in the armature and output shaft define the converter of the rotary solenoid.

It is another object of my invention to provide a single ball converter, of the nature above described, the center of which lies axially within the outside diameter of a shank, of the output shaft.

It is a further significant object of this invention to provide one of the ball race cam surfaces in either the armature or output shaft which is substantially wider than the diameter of the ball thereby to permit shifting of the ball radially of the output shaft to prevent any possibility of binding upon energizing of the solenoid.

It is an important object of this invention to provide means for limiting the maximum arcuate movement of a clapper type armature and particularly desirable to make such limiting means adjustable to vary the stroke.

It is a further object of my invention to provide shims between the solenoid casings and the hinged clapper armature thereby suitably to prevent wear of the armature and casing where hinged.

A further object of my invention is to provide antifriction thrust bearing means rotatably supporting an enlarged head of the output shaft circumferentially at a position radially spaced a greater distance from the rotational axis of the output shaft than the center of the ball converter, and particularly to provide such antifriction bearing means lying between bearing surfaces extending at an angle to the rotational axis of the output shaft.

Another significant object of my invention is to provide an output shaft of magnetizable material thereby to constitute a part of the magnetic fields of the solenoid when energized.

Other objects and advantages of this invention will be particularly set forth in the claims and will be apparent from the following description:

Figure 6:
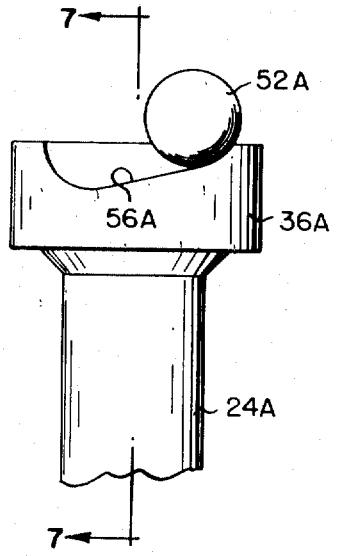
FIGURE 6 is a fragmentary front elevational view of the second embodiment shown in FIGURE 5 with the ball converter added and in the highest portion of the cam race.
Figure 7:
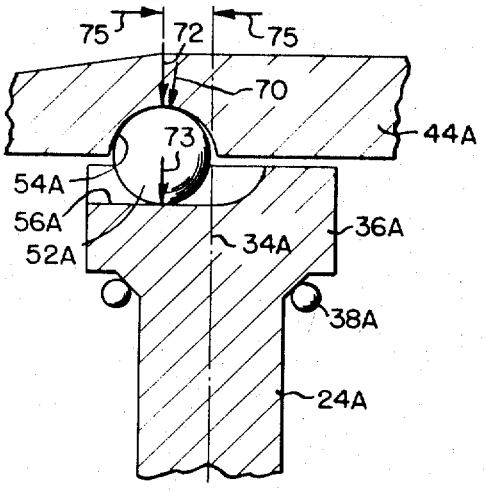

FIGURE 7 is a sectional view of FIGURE 6 taken along the lines 7—7 looking in the direction indicated by the arrows 7—7 with the ball 52 in the lowest portion of the cam race and with a fragmentary portion of the armature of my second embodiment added.

Figure 8:
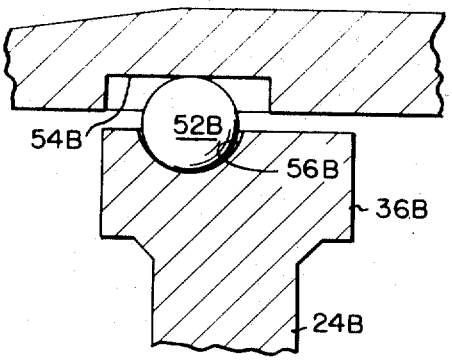

FIGURE 8 is a fragmentary sectional view of a third embodiment of my invention illustrating the armature and output shaft in a manner corresponding to FIGURE 7.

Figure 9:
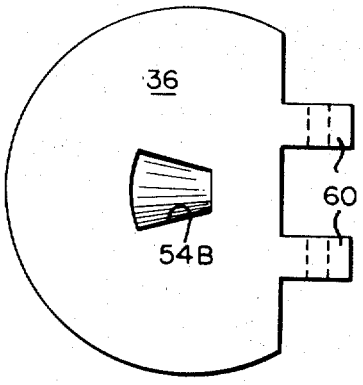

FIGURE 9 is a bottom planar view of the armature of a third embodiment of my invention shown in FIGURE 8.

Figure 10:
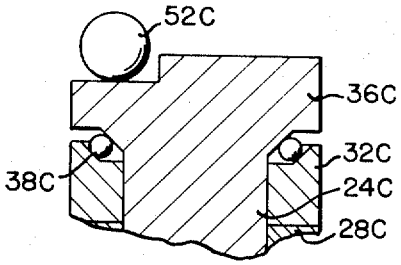

FIGURE 10 is a fragmentary sectional view of only the ball converter and output shaft of a fourth embodiment of my invention.

Figure 1:
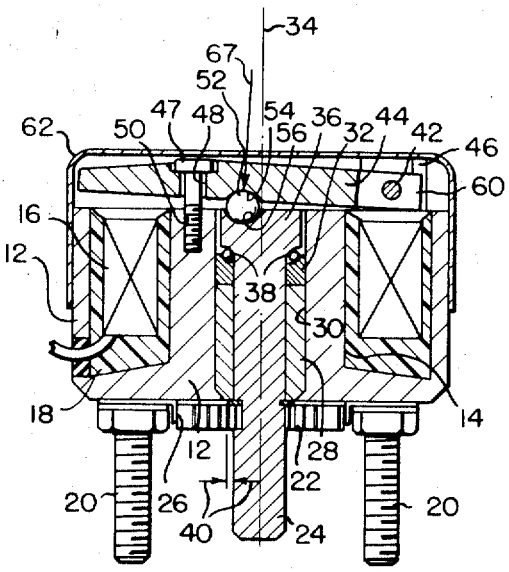
FIGURE 1 is a sectional view of one embodiment of my invention.
Figure 2:
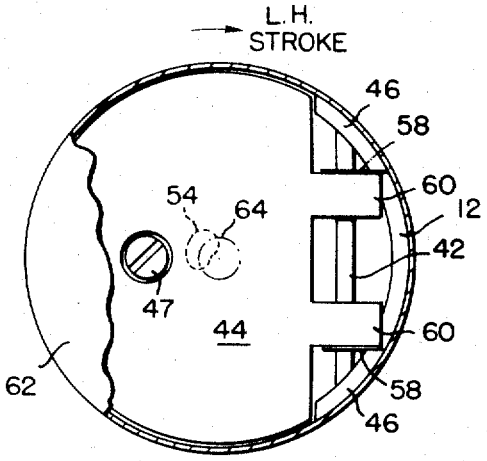
FIGURE 2 is a top planar view with parts broken away of the FIGURE 1 embodiment of my invention.

With reference to FIGURES 1 and 2, this construction comprises a cast or milled casing 12 of suitable magnetizable material. Casing 12 is provided with an annular opening 14 adapted to receive a suitable annular solenoid coil or windings 16 encapsulated in an epoxy resin 18. Rigidly affixed to the casing 12 are a pair of suitable mounting screws or lugs 20 for attaching the entire rotary solenoid unit described herein to any one of a number of suitable devices with which it is used. Mounted on the bottom of the casings is a torsion return spring 22 suitable for attachment to an output shaft 24 for returning the output shaft to its normal inoperative position when the solenoid is de-energized. The torsion spring 22 is retained on the bottom of the casing 12 by means of a suitable spring retainer 26.

The output shaft 24 is rotatably received in a suitable output shaft cylindrical bushing or bearing 28 being *wedged* [swedged] with a central opening 30 of the casing 12. A lower race 32 of an antifriction thrust bearing unit is mounted on top of the cylindrical output shaft bearing 28. As will be seen from FIGURE 1, the bearing race 32 has an upper surface making an angle of preferably 45° with rotational axis 34, and the output shaft 24. This angular surface is preferably parallel to a lower surface race surface provided on the output shaft at a shouldered portion formed where an enlarged head 36 of the output shaft 24 is reduced in diameter to a smaller and axially longer shank portion extending from the enlarged head to the bottom of the output shaft. I provide a plurality of antifriction balls 38 intermediate the two angular race surfaces, thereby to provide an antifriction thrust bearing for the output shaft 24 coacting with the output aft bearing 28 to maintain output shaft 24 in its central ›sition for rotation.

As is exaggerated by the arrows 40, at the lower end the output shaft 24, I provide a slight spacing extend- g circumferentially around and between the entire ank output shaft 24 and output bearings 28 and lower ce 32 of the thrust bearing. The magnitude of circum- rential spacing 40 indicated by the arrows 40 varies th the diameter of the output shafts. The magnitude clearance appropriate for an approximately ¼ inch ameter shaft 24 should be in the order of .0005–.0015 ch extending circumferentially around the entire shank the output shaft. This circumferential spacing is of sig- ficant importance to preclude binding which might other- se occur between the output shaft 24 and the output aring 28 and lower race 32. However, it is so small at I have only illustrated it by the exaggerated spacing.

A clapper armature 44 is pivotally hinged by a pair of mature hinge projections 60 thereof onto a hinge pin 40.

Regarding importance of tolerances between parts, ref- ence is now made to the hinge pin or shaft 42 which sirably fits as snugly as possible within an opening pro- ded through armature hinge extensions 60 and through ›rizontal openings extending through casing side wall rtical extensions 46 of the casing 12. It is desirable at the tolerances between these parts be initially main- ined within .0001 and .00025 inch circumferentially ound the entire hinge pin. I provide a pair of stainless el shims 58 having an opening therein and mounted ı hinge pins 42 providing a bearing surface between clap- r armature extensions 60 and casing extensions 46, all which structure coactively serves to maintain the clap- r armature 44 in proper aligned relationship as it is cuately moved from the normal inoperative position own in FIGURE 1 to the energized position in which it magnetically attracted to and engages the upper surface the casing 12 upon energizing of the solenoid.

It is of significant importance that I provide an ad- stable limit screw or post 47 traversing an enlarged ›ening 48 in the clapper armature 44 and is threadedly ceived in a threaded opening 50 of the casing 12. This justable screw is preferably a self-locking screw such the one sold under the trademark "NYLOK" and such screw serves to limit the upward movement of the clap- r armature 44 and in turn provides means for varying e stroke of output shaft 24. This is the first variable ·oke rotary solenoid of which I am aware.

Arcuate movement of the clapper armature 44, re- onsive to energizing of the solenoid, is converted into tary movement of the output shaft 24 by means of only single converter ball 52 coactive with a pair of oppo- ely inclining converter ball race cams 54 and 56 in the wer surface of the clapper armature 44 and in the up- r surface of the output shaft 24 respectively.

Another significant aspect of my invention as pointed t above is to make the output shaft 24 of magnetiz- le material thereby to increase the magnetizable ma- ·ial working on the armature and in turn efficiency of e unit. Thus, the output shaft becomes a part of the agnetic circuit of the solenoid to increase the mag- tic force applied to the clapper armature 44 when the lenoid is actuated. The entire upper portion of the ro- :y solenoid unit is enclosed by a non-magnetic cover 62.

It is of significant importance to my invention that I ovide only a single ball within the inside diameter of e windings 16 and within the magnetic circuit. Thus, e single ball converter lies internally of the central ening 30, of the annular casing 12. This aspect has ıny advantages and particularly in combination with a ıpper type armature 44. This greatly minimizes the prob- n of aligning races which you have with multiple ball nverters.

As contrasted to my earlier invention having a roller d cam, I am by this invention able to eliminate the ction between the roller and pin. In the past, most inventors of ball type converters deemed it necessary to provide a plurality of balls in order to balance the force applied through the antifriction balls to the output shaft, such as for example as is shown by Vandewege 3,148,552 and whenever anyone in the prior art tried to use a single ball converter such as Grover 3,124,009, the inventor found it necessary to provide a very complicated device. Grover shows the ball converter being caged and a second caged ball below it to balance forces, all of which is far less efficient and far more complicated and far less compact. I am able to overcome the problems of the prior art by providing the converter ball 52 inside the inside diameter of the windings 16 on top of the output shaft, and preferably the center of the ball axially vertically within the cross section of the shank of the output shaft 24 and only sufficiently off center from the rotary axis 34 of the output shaft to convert the arcuate movement of the clapper armature 44 to rotary motion the output shaft 24. All the embodiments of my invention with the exception of the FIGURE 10 of the embodiment, which is a less desirable embodiment, are of the preferred construction with the center of the ball lying axially within the cross section of the output shaft shank.

It is also significant that the thrust bearings 38 lie in an outboard position radially of the center of the converter ball 52 with respect to the axis of rotation 34.

With reference to FIGURE 2, I have shown at 64 the center line of the arcuate path of the ball converter 52.

Figure 3:
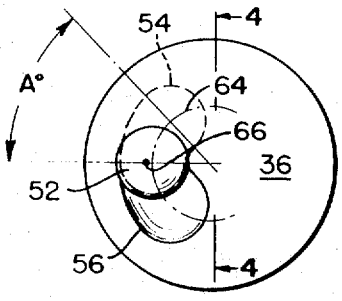
FIGURE 3 is an enlarged top view of the output shaft and ball converter of the FIGURE 1 embodiment.
Figure 4:
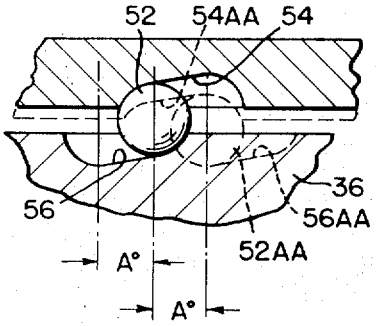
FIGURE 4 is a fragmentary view and linear expansion of the ball race cam surface of FIGURE 3 taken along the center line thereof looking in the direction indicated by the arrows 4—4.

In FIGURE 3, I have illustrated an enlarged top planar view of the enlarged head 36 of the output shaft 24, showing the output shaft ball race cam at 56 in solid lines and the relative position of the clapper armature race transposed in broken lines at 54 over the output shaft head 36 and ball 52, when the output shaft 24 and clapper armatures 44 are in the neutral, inactive and de-energized position, illustrated in FIGURE 1. The ball is in the highest portion of both race cams—the ball is in the solid line position of FIGURE 4. When the solenoid is energized and the clapper armature 44 is pivoted arcuately away from the inactive position of FIGURE 1, the force is transmitted from the clapper armature race cam 54 to the ball, to the output shaft race cam 56 thereby to rotate the output shaft 24 in a clockwise direction as viewed in FIGURE 3, which is a left hand stroke of the output shaft looking from the lower end thereof as indicated by the arrow and legend of FIGURE 2. The ball converter 52 is in this manner actuated from the high point of the ball race cam surfaces 54 and 56 to the low point 52AA as illustrated linearly in FIGURE 4. With the ball 52 illustrated in the lowermost position 52AA of the ball race cam surfaces at 54AA and 56AA, the output shaft 24 will have made the rotary stroke of twice what is indicated by the angle "A." The irregular planar shape of each of the ball races as best seen at 54 in FIGURE 2 arises by reason of the arcuate movement of the clapper armature 44 and upward inclined cam surface of the ball races.

I shall now describe a significant aspect of my invention which is to make at least one ball race cam surface substantially "wider in cross section than the corresponding cross section of the ball" which in FIGURES 1–3 is the output shaft ball race cam surface 56. It is intended that the phrase "wider in cross section than the corresponding cross section of the ball" means that the distance between any two points on the cam surface making a chord across the ball are of substantially greater distance than the chord made on the ball. This permits the ball 52 to gradually shift radially from the normal inactive position illustrated by the dot in FIGURE 3 designated by the numeral 66 to the final position of the ball indicated by the arcuate center line of travel 64. The dot 66 is spaced an exaggerated distance from the center line 64 merely to illustrate this fact, whereas such shifting is very minute. The arrow 67 of FIGURE 1 illustrates the direction of initial force which is normal to the clapper armature 44 and in the end of the stroke of the output shaft the force is parallel to the axis 34 of rotation of the output shaft 24. It will be understood that this shifting of force and position of the ball in the wider race is occasioned by the arcuate path of the armature. Thus, it is important that at least one of the ball races 56 or 54 be wider than the ball thereby to permit a slight radial shifting of the force and ball without binding of the ball due to the arcuate movement of the clapper solenoid 44.

The clapper ball race 54 may in cross section be of substantially the same diameter as the ball, thereby to orient the ball and maintain it along substantially the arcuate path 64 as the clapper armature closes.

It will be understood that it would be possible to make both of the ball races 54 and 56 substantially wider in cross section than the ball thereby to facilitate radial shifting of the ball; however, one race should be sufficiently similar in cross sectional width as the ball thereby to generally orient the path of travel of the ball.

Figure 5:
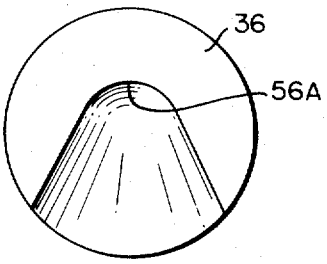
FIGURE 5 is a top planar view of a second embodiment of an output shaft construction corresponding to the FIG. 3 view of the first embodiment.

In FIGURES 5–9 inclusive showing second and third embodiments, the same or corresponding parts to those illustrated in the first embodiment are designated by the same numbers shown in FIGURES 1–3 followed by the suffix A in FIGURES 5–7 and the suffix B in FIGURES 8 and 9.

I have discovered that the preferred improved constructions is to provide one of the cams with a flat surface as opposed to generally arcuate wider ball race 56 of the FIGURE 1–3 embodiment. As illustrated in FIGURE 7 by the arrow 70, the initial load upon energizing of the clapper armature 44A is applied normal to the clapper armature thereafter the ball is permitted to shift slightly radially in response to shifting of the load transmitted by armature 44A to a substantially vertical force indicated by the arrows 72 and 73 due to arcuate movement of the armature 44A. The single point of contact between the ball 52A and the flat cam surface 56A means that the load is always transmitted to the output shaft in a vertical direction. The somewhat wider ball race 54A in the armature than in the FIGURE 1 embodiment facilitates shifting while still functioning to generally orient the ball. Notice that the force 73 is in a vertical direction to the output shaft 24A at a point inside of the radius of the output shaft shank, thereby minimizing the stresses on the thrust bearing 38A. Whereas with the FIGURE 1 embodiment, although there would be a slight shifting axially of the ball 52 nonetheless, the force would not be applied in a vertical direction until the clapper is in closed position, thereby increasing the possibility of binding and stresses across the thrust bearing 38.

While in FIGURES 5–7 inclusive, I have shown the flat cam 56A in the output shaft, it is acceptable as shown in FIGURES 8 and 9 to provide the flat ball race cam surface 54B in the armature and the orienting ball race cam surface 56B in the output shaft.

FIGURE 10 merely illustrates the latitude of my invention includes being able to provide the ball 52C within the annular openings 30 of the casing 12 illustrated in FIGURE 1 but the center of the ball lying axially outside of the cross section of the shank of the output shaft 24C. However, the thrust bearings 38C nonetheless lie radially outboard from the center of the ball 52C. This is not the preferred construction but merely illustrative of the scope of my invention.

I have further discovered that the positioning of the center of the ball relative to the rotational axis 34 is preferably approximately one-half the diameter or the radius of the ball as illustrated by the arrows 75 of FIGURE 7 in order to provide the best mechanical advantage with minimum stresses on bearings and within the capabilities of solenoid units of this size.

My above invention describes the most efficient with the highest mechanical advantage of any rotary solenoid of which I am aware and is the only one suitable for providing output strokes in the range of 360° if desired. I accomplish this by providing a single ball converter approaching very closely to the center of rotation of the output shaft. By keeping the race as close to the center point as possible in the units, I am able to attain a very high mechanical efficiency, due to the steepness of the converting angle; the further out the converter ball and race is spaced from the rotational axis of the output shaft, the shallower the converting angle becomes until a critical angle is reached, at which a rotary solenoid will not work. With my invention it is now possible to obtain strokes approaching 360° in one continuous motion.

While I have described the preferred form of my invention it will be apparent that various modifications and changes may be made therein, without departing from the spirit of my invention as set forth in the appended claims.

1. An improvement in a rotary activating device having a solenoid winding, an output shaft rotatably mounted axially within said winding, an armature movably mounted relative to said winding responsive to the magnetic field thereof, *said armature being hinged for arcuate movement relative to said shaft,* said improvement comprising only a single antifriction ball between said armature and top of said shaft and axially lying within the inside diameter of said windings and converter means between said shaft and armature coactive with said ball for imparting rotation to said shaft responsive to magnetic responsive movement of said armature.

2. An improvement in accordance with claim 1 in which the center of said ball lies axially within the outside diameter of a shank of said shaft being rotatably retained within said windings.

3. An improvement in accordance with claim 2 in which the center of said ball is substantially not more than one-half its diameter from the rotational axis of said shank.

4. An improvement in accordance with claim 1 in which said converter means includes a ball race in one of said shaft and armature which is substantially wider in cross section than the corresponding cross section of said ball thereby to permit said ball to shift radially from a normal inoperative position when actuated by said armature.

[5. An improvement in accordance with claim 4 in which said armature is hinged for arcuate movement relative to said shaft.]

6. An improvement in accordance with claim [5] *1* including limit means between said windings and an unhinged side of said armature for limiting the maximum arcuate movement of said armature.

7. An improvement in accordance with claim 6 in which said limit means includes adjustable means for varying the maximum arcuate movement.

8. An improvement in accordance with claim [5] *1* including a casing in which said winding is mounted and to which said armature is hinged and shim means between said casing and armature where hinged for minimizing wear therebetween.

9. An improvement in accordance with claim 4 in which said one ball race is substantially flat in cross section.

10. An improvement in accordance with claim 9 including a second ball race in the other of said shaft and armature which ball race substantially confines said ball to a substantially circular path about the rotational axis of said shaft thereby to orient said ball during relative movement of said shaft and armature.

11. An improvement in accordance with claim 4 including an axial opening in said winding adapted to rotatably receive a shank of said shaft, said opening being of only sufficiently larger inside diameter than the outside diameter of said shank to prevent binding between said shaft and opening.

12. An improvement in accordance with claim 1 in which said shaft has a shank and an enlarged head and including antifriction bearing means within said windings r rotatably supporting said head, said bearing means ing a greater distance radially from the rotational axis said shaft than the center of said bill.

13. An improvement in accordance with claim 12 in ıich the bearing surface of said head makes an angle th the rotational axis of said shaft.

14. An improvement in accordance with claim 1 in ıich said shaft is magnetic material thereby to form part of the magnetic field of said windings.

15. An improvement in a rotary actuating device hav- g a solenoid winding, an output shaft rotatably mounted ially within said winding, an armature movably ounted relative to said winding responsive to the mag- tic field thereof, said improvement comprising, at least one antifriction ball between said armature and top of said shaft, a first ball race in one of said shaft and armature, said first ball race substantially confining [said] said ball to a substantially circular path about the rotational axis of said shaft thereby to orient said ball during relative movement of said shaft and armature, a second ball race in the other of said shaft and armature, said second race being substantially wider in cross section than the corresponding cross section of said ball thereby to permit radial shifting of said ball from a normally inoperative position when actuated by said armature.

16. An improvement in accordance with claim 15 in ıich said second ball race is substantially flat in cross ction.

17. An improvement in a rotary actuating device hav- g a solenoid winding, an armature hingedly mounted lative to said winding and being responsive to the mag- tic field thereof for movement relative to said winding d an output shaft rotatably mounted axially within d winding and being rotated responsive to movement said armature, said improvement comprising limit ans between said windings and an unhinged side of d armature for limiting movement of said armature.

18. An improvement in accordance with claim 17 in ıich said limit means includes adjustable means for rying the maximum arcuate movement.

19. An improvement in a rotary actuating device hav- g a solenoid winding, a casing in which said winding is ounted, an armature hingedly mounted on said casing ative to said winding and being responsive to the magnetic field of said winding for movement relative to said winding and an output shaft rotatably mounted axially within said winding and being rotated responsive to movement of said armature, said improvement comprising shim means between said casing and armature where hinged for minimizing wear therebetween.

20. In a rotary actuating device, a solenoid winding, a magnetizable output shaft rotatably mounted axially within the magnetic field of said winding, an armature moveably mounted relative to said winding responsive to the magnetic field thereof and being coupled to said shaft for imparting rotating movement to said shaft responsive to movement of said armature.

21. In a rotary actuating device, a solenoid winding, an armature movably mounted relative to said winding responsive to the magnetic field thereof for movement relative to said winding, an output shaft rotatably mounted axially within said winding, means between said armature and shaft for imparting rotary motion to said shaft responsive to magnetic movement of said armature, and adjustment means for adjustably varying the stroke of said shaft responsive to said armature.

22. A rotary actuating device in accordance with claim 21 in which said adjustment means comprises means for limiting the movement of said armature.

References Cited

The following references, cited by the Examiner, are of record in the patented file of this patent or the original patent.

UNITED STATES PATENTS

| | | | |
|---|---|---|---|
| 3,073,995 | 1/1963 | Phinizy et al. | 335—228 |
| 3,136,930 | 6/1964 | Straub | 335—228 |
| 3,144,593 | 8/1964 | Ganowsky | 335—272 |
| 3,435,391 | 3/1969 | Straub | 335—228 |

FOREIGN PATENTS

| | | | |
|---|---|---|---|
| 920,334 | 3/1963 | Great Britain | 335—228 |
| 1,036,204 | 7/1966 | Great Britain | 335—228 |

GEORGE HARRIS, Primary Examiner

U.S. Cl. X.R.

74—99; 310—37; 335—272